(12) United States Patent
Georgeson et al.

(10) Patent No.: US 10,954,002 B2
(45) Date of Patent: Mar. 23, 2021

(54) METHODS FOR THERMOGRAPHIC INSPECTION OF STRUCTURES

(71) Applicant: The Boeing Company, Chicago, IL (US)

(72) Inventors: Gary E. Georgeson, Tacoma, WA (US); Jeffrey G. Thompson, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 337 days.

(21) Appl. No.: 15/944,353

(22) Filed: Apr. 3, 2018

(65) Prior Publication Data

US 2019/0300205 A1 Oct. 3, 2019

(51) Int. Cl.
*G01N 25/72* (2006.01)
*G01J 5/00* (2006.01)
*G01K 1/00* (2006.01)
*G01K 13/00* (2006.01)
*B64F 5/60* (2017.01)
*G01N 25/20* (2006.01)
*G06T 7/00* (2017.01)

(52) U.S. Cl.
CPC ............. *B64F 5/60* (2017.01); *G01N 25/20* (2013.01); *G01N 25/72* (2013.01); *G06T 7/0004* (2013.01)

(58) Field of Classification Search
USPC ........................ 374/5, 4, 141, 208, 121, 124
See application file for complete search history.

(56) References Cited

U.S. PATENT DOCUMENTS

| 7,513,964 | B2 | 4/2009 | Ritter et al. |
| 7,871,040 | B2 | 1/2011 | Lee et al. |
| 9,645,012 | B2 | 5/2017 | Marsh et al. |
| 2006/0043303 | A1 | 3/2006 | Safai et al. |
| 2008/0107147 | A1 | 5/2008 | Kollgaard et al. |
| 2008/0307886 | A1 | 12/2008 | Marsh et al. |
| 2011/0249700 | A1* | 10/2011 | Nakagawa ............. G01N 25/72 374/4 |
| 2013/0261989 | A1* | 10/2013 | Plotnikov ............. G01N 25/72 702/40 |
| 2015/0260667 | A1* | 9/2015 | Isakov ................... G01N 25/72 374/5 |

* cited by examiner

Primary Examiner — Mirellys Jagan
(74) Attorney, Agent, or Firm — Hanley, Flight & Zimmerman, LLC

(57) ABSTRACT

Methods for thermographic inspection of structures are disclosed. An example method includes positioning at least one of a heat source or a camera in a cavity defined by a first side of a structure of an aircraft and positioning the other one of the heat source or the camera at a second side of the structure opposite the first side; applying heat to the least one of the first side or the second side of the structure; measuring thermal energy emitted from the other one of the first side or the second side opposite the heat source; and identifying a defect or inclusion of the structure based on the measured thermal energy.

15 Claims, 10 Drawing Sheets

METHODS FOR THERMOGRAPHIC INSPECTION OF STRUCTURES

FIELD OF THE DISCLOSURE

This disclosure relates generally to infrared thermography inspection and, more particularly, to methods for infrared thermography inspection of structures.

BACKGROUND

Aircraft components made of light-weight materials (e.g., composite materials) require inspection. Non-destructive evaluation (NDE) techniques, also known as non-destructive inspection (NDI) techniques, are often employed to inspect aircraft components. NDE typically involves thoroughly examining a structure without destroying the structure or requiring significant disassembly of the structure.

SUMMARY

In some examples, a method includes positioning at least one of a heat source or a camera in a cavity defined by a first side of a structure of an aircraft and positioning the other one of the heat source or the camera at a second side of the structure opposite the first side; applying heat to the least one of the first side or the second side of the structure; measuring thermal energy emitted from the other one of the first side or the second side opposite the heat source; and identifying a defect or inclusion of the structure based on the measured thermal energy.

In some examples, a method includes decreasing a temperature of a first surface at a first side of a structure to a temperature that is less than an ambient temperature; increasing a temperature of a second surface at a second side of the structure to a temperature that is greater than the ambient temperature, the second side of the structure opposite the first side, the first side and the second side separated by a thickness of the structure; and obtaining imaging data of the second surface as the temperature of the second surface of the structure returns to the ambient temperature.

In some examples, a method includes receiving a fuselage portion having a stringer coupled to a skin, the stringer having a first riser, a second riser, and a chord coupled to respective first ends of the first riser and the second riser, respective ones of inner surfaces of the first riser, the second riser, and the chord defining a first side of the stringer, respective ones of outer surfaces of the first riser, the second riser and the chord defining a second side of the stringer opposite the first side, the skin coupled adjacent the second ends of the first riser and the second riser, the first riser, the second riser, the chord and the skin defining an enclosed cavity being accessible only at respective longitudinal ends of the stringer; positioning a heater in the enclosed cavity; increasing a temperature of a first surface at the first side of the stringer and a second surface at the second side of the stringer to a temperature that is greater than ambient temperature, the first surface and the second surface being separated by a thickness; positioning a camera on the second side of the stringer; obtaining imaging data of the second surface as the temperature of the second surface of the structure returns to the ambient temperature; and analyzing the imaging data to identify a defect or inclusion of the stringer.

Figure 1:
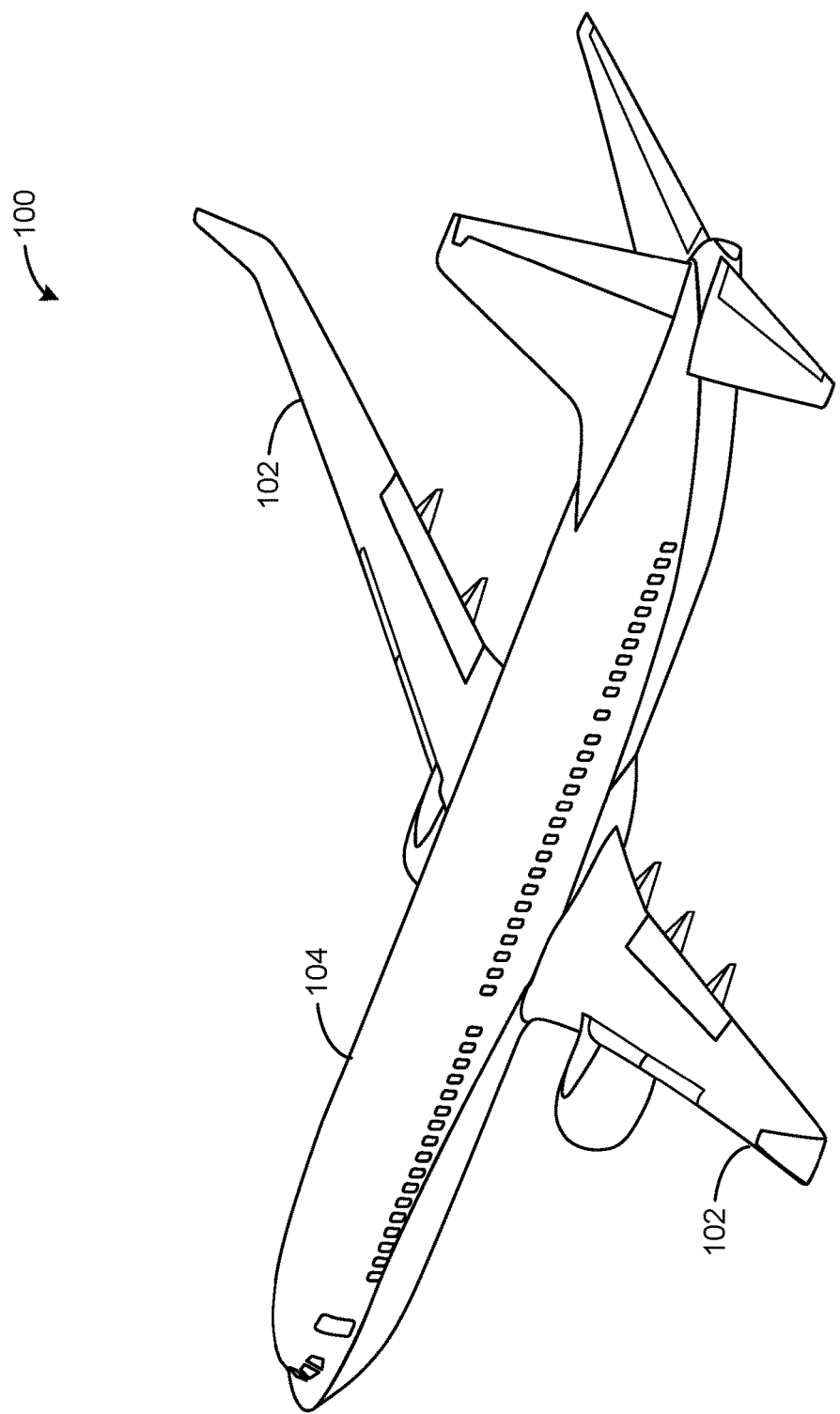
FIG. 1 illustrates an example aircraft having structures that can be inspected via example non-destructive inspection (NDI) systems in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Non-destructive tests (NDT) or evaluation techniques are often employed to inspect aircraft surfaces and/or other composite structures for surface irregularities and/or hidden flaws. For example, a component constructed of a composite material can have surface irregularities and/or flaws both at the surface and below the surface of the composite material. Such surface irregularities and hidden flaws such as scratches, holes, cracks, voids, disbonds, and hidden porosities can go undetected without suitable inspection.

NDT typically involves thoroughly examining a structure without destroying the structure or requiring significant disassembly of the structure. An inspection can be performed during manufacture of a structure and/or after a structure has been put in service. For example, NDT inspection of primary structures is a necessary part of the manufacturing process and must be done at a rate capable of keeping up with the production schedule of the aircraft.

Some NDT methods for inspecting barrel-shaped fuselage and/or wing sections employ ultrasonic inspection techniques. Ultrasonic inspection techniques include multi-axis robotic systems that move ultrasonic transducer arrays (e.g., over the outer mold line (OML) of the fuselage and/or wing sections) using encoded rails and/or end effectors guided to follow pre-programmed paths. Although ultrasonic transducers are effective at performing NDT, ultrasonic inspection techniques are often time consuming.

Thermography is an NDT inspection technique that can be used to nondestructively evaluate structural components for sub-surface defects. Thermography is effective for uncovering internal bond discontinuities, delamination, voids, inclusions, and other structural defects that are not detectable by visual inspection of the component. Thermography inspection techniques can be up to four times faster than ultrasonic inspection techniques. However, thermography inspection techniques can be limited due to space constraints and/or material thicknesses of a structure. Thermography (e.g., active thermography) includes a heat source to apply heat to a specimen to induce relevant thermal contrasts in the regions of interest and a thermal camera (e.g., an infrared camera) to detect anomalies in the heating and/or cooling behavior, which can be caused by subsurface defects affecting (e.g., blocking) diffusion of heat from the sample surface to the interior of the sample. Thermography (e.g., active thermography) includes reflective (e.g., single-sided) techniques or through transmission (double-sided) techniques. Reflective thermography includes applying heat to a first side of a structure and obtaining a thermal image of the first side of the structure to perform non-destructive evaluation. Through transmission thermography includes applying heat to a first side of a structure and obtaining a thermal signature of a second side of the structure opposite the first side to perform a non-destructive evaluation.

Examples disclosed herein employ thermography techniques to conduct non-destructive testing (NDT) or non-destructive evaluation (NDE) of structures. For example, to detect a defect (e.g., subsurface defect) of a structure, example methods and apparatus disclosed herein employ thermography methods and apparatus to detect local variations in thermal diffusivity or thermal conductivity in regions of interest (e.g., at or beneath a surface of a structure). More particularly, these defects cause the surface immediately above the defect to heat and/or cool at a different rate than the surrounding defect-free areas. For example, thermography techniques disclosed herein involve heating and/or cooling a sample to create a difference between the sample temperature and the ambient temperature and then observing or analyzing a thermal signature (e.g., radiation) of the structure to detect a defect.

Example methods and apparatus disclosed herein employ through-structure transmission thermography. Specifically, employing the through-structure transmission techniques disclosed herein includes applying heat to a first side of a first structure or region of interest via a heater/cooler (e.g., a heat source) and obtaining or capturing a thermal image of a second side of the first structure or region of interest opposite the first side via a camera (e.g., an infrared camera). In particular, the example methods and apparatus disclosed herein are particularly advantageous for conducting NDT of structures having cavities and which are located in space-confined areas (e.g., space-limited) areas. In some examples, the methods and apparatus disclosed herein include obtaining a thermal image of a first side of a structure and a thermal image of a second side of the structure opposite the first side. In some such examples, the thermal image of the first side of a first region of interest and the thermal image of the second side of the first region of interest are obtained at the same time (e.g., simultaneously). Thermography inspection apparatus and methods disclosed herein can be used on metals, such as ferrous materials, including steel, or on non-metallic materials, such as plastics, ceramics, and/or composite materials (e.g., composite laminate made of fiber reinforced plastic, etc.) and/or any other suitable materials.

FIG. 1 illustrates an example aircraft 100 having structures that can be tested by the example apparatus and methods described herein. FIG. 1 illustrates an aircraft 100 including wings 102 (e.g., a right wing and a left wing) extending laterally outward from a fuselage 104, which can enclose a passenger cabin and/or a cargo area.

Figure 2:
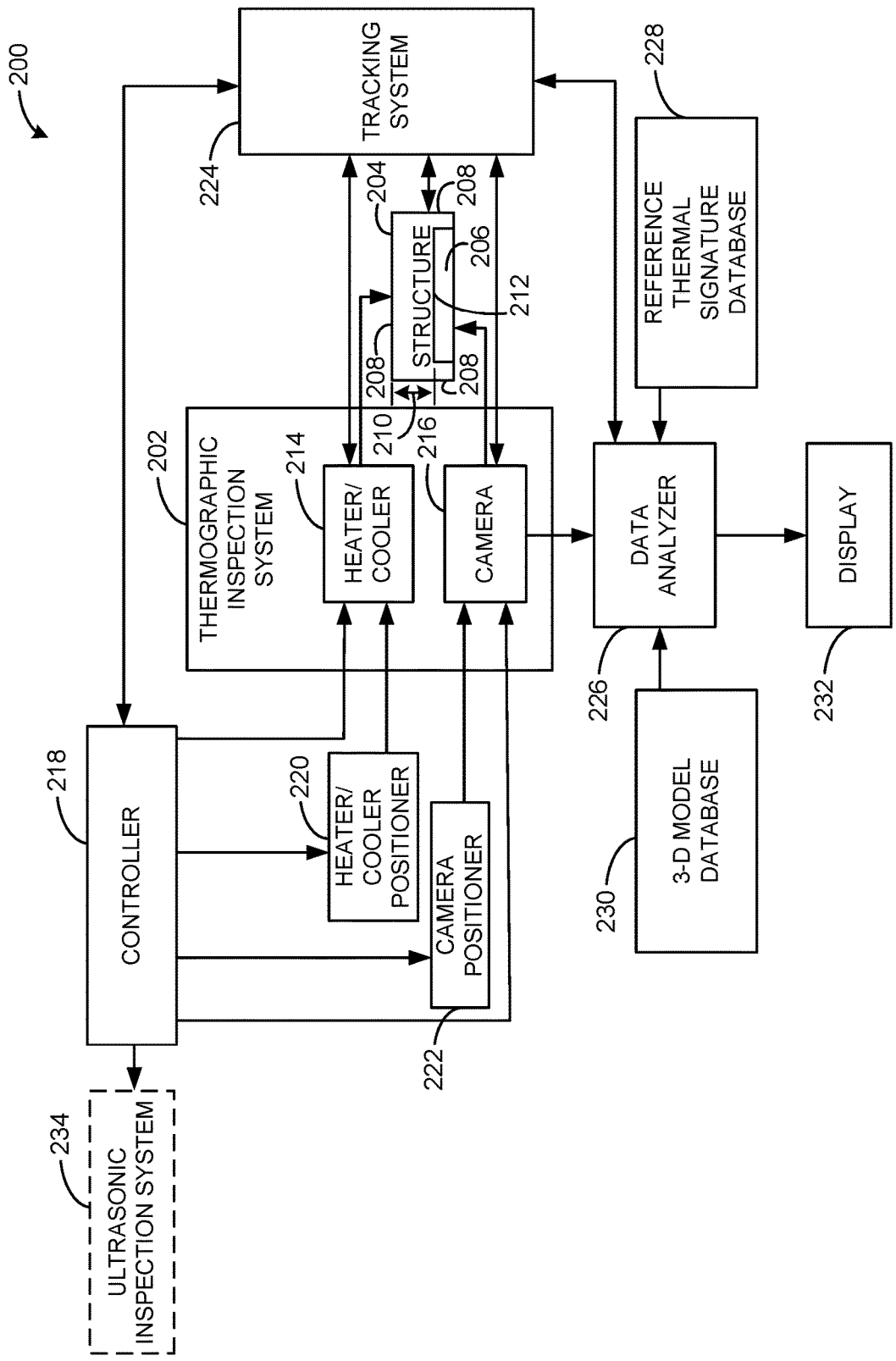
FIG. 2 is a block diagram of an example non-destructive inspection (NDI) system employing a thermography inspection system constructed in accordance with teachings of this disclosure that can be used to inspect the example aircraft of FIG. 1.

FIG. 2 is a schematic illustration of a non-destructive inspective (NDI) system 200 employing a thermographic inspection system 202 in accordance with teachings of this disclosure. For example, the NDI system 200 of FIG. 2 can be employed to inspect a structure 204 (e.g., a structural component of the aircraft 100 of FIG. 1). The thermographic inspection system 202 of the illustrated example inspects the structure 204 in a non-contact, non-couplant manner. Specifically, the thermographic inspection system 202 of the illustrated example is a through-structure thermographic inspection system that can inspect structures having enclosures and/or structures having complex or varying contours and which are located in limited access locations. For example, the structure 204 of the illustrated example is an enclosure that includes a cavity 206. For example, the cavity 206 of the illustrated example is surrounded or enclosed by walls 208 of the structure 204 and the cavity 206 is accessible via one or more respective ends of the structure 204. As described in greater detail below, the thermographic inspection system 202 of the illustrated example enables a structure (e.g., the structure 204) having a greater thickness 210 (e.g., a composite laminate having a thickness of approximately 0.16 inches (20 plies, where each ply is 0.008 inches) and a metallic structure having a thickness of approximately 0.1 inches) to be imaged with improved sensitivity to flaws or defects near an inner surface 212 (e.g., an interior surface accessible from inside the cavity 206) than would otherwise be possible by using known one-sided or reflective thermographic techniques (e.g., infrared thermography).

The thermographic inspection system 202 of the illustrated example is a through-structure transmission, thermographic inspection system that detects a thermal gradient across the thickness 210 of the structure 204 and/or on the surfaces of the walls 208. The thermographic inspection system 202 of the illustrated example employs a scanning assembly that includes a heater/cooler 214 to generate the thermal gradient across the structure 204 and a camera 216 to obtain or capture a thermal signature of the structure 204 when the structure 204 is subjected to the thermal gradient. The heater/cooler 214 of the illustrated example can be a thermal energy source (e.g., to provide a thermal pulse sufficient) to generate the thermal gradient across the thickness 210 of the structure 204. The heater/cooler 214 of the illustrated example can be a heat source including, but not limiting to, a flash lamp, a hot air blower to increase a temperature of the structure 204 relative to ambient temperature, a cool air blower to decrease a temperature of the structure 204 relative to ambient temperature, a light, and/or any other heat source and/or cooler that can increase and/or decrease a temperature (e.g., of the surfaces of the walls 208) of the structure 204 relative to ambient temperature. The camera 216 of the illustrated example includes, but is not limited to, an infrared camera. To control (e.g., the operation of) the heater/cooler 214 and the camera 216, the heater/cooler 214 and the camera 216 of the illustrated example are communicatively coupled to a controller 218.

To support and/or move the heater/cooler 214 relative to the structure 204, the NDI system 200 of the illustrated example includes a heater/cooler positioner 220. To support and/or move the camera 216 relative to the structure 204, the NDI system 200 of the illustrated example includes a camera positioner 222. The heater/cooler positioner 220 and/or the camera positioner 222 of the illustrated example can be implemented by one or more robots that travel along tracks. As used herein, the term "tracks" encompasses rails, grooves, guide surfaces, and/or equivalents thereof. A track can be straight (i.e., linear) or curved. In some examples, a position and/or movement of the heater/cooler 214 and/or the camera 216 can be provided by a magnetically coupled crawler, a magnetically coupled robotic end effector, a self-propelled crawler, a carriage, a gantry (e.g., platforms that span the structure 204 and travel along parallel tracks) and/or any other device capable of moving and/or positioning the heater/cooler 214 and/or the camera 216 relative to and/or along (e.g., a length of) the structure 204. To control a position or location of the heater/cooler 214 relative to the structure 204 and/or the camera 216, the heater/cooler positioner 220 of the illustrated example is communicatively coupled to receive, retrieve and/or otherwise obtain instructions or commands from the controller 218. To control a position of the camera 216 relative to the structure 204 and/or the heater/cooler 214, the camera positioner 222 of the illustrated example is communicatively coupled to receive, retrieve and/or otherwise obtain instructions or commands from the controller 218.

In some examples, the structure 204 can be a relatively large structure that requires the thermographic inspection system 202 to inspect areas, portions or regions at a specific instance in time. For example, the heater/cooler 214 can be effective to heat or cool a region or portion of the structure 204 over a duration (e.g., a thermal diffusion time of approximately 1 second to 2 seconds for a 0.1 inch aluminum structure, a thermal diffusion time of approximately 15 seconds for a 0.16 inch (20 ply) composite structure, etc.), and the camera 216 obtains several images of the heated/cooled portion of the structure 204 over a duration (e.g., approximately between 1 to 15 seconds) during which the structure 204 returns to ambient temperature. The time needed to increase a temperature of the structure 204 to a temperature needed for a desired quality of a thermal signature depends on the thickness 210 (e.g., an overall thickness) of the structure 204. For example, the thicker the structure, the more time that is needed to vary the temperature of the structure and/or the more time needed for the structure to return to ambient temperature (e.g., an initial temperature prior to heating and/or cooling). For example, the time needed to obtain a thermal signature of the structure 204 can be provided by Equation 1, which provides a relationship between an observation time t and a subsurface defect depth z and given as:

$$t=z^2/\alpha \qquad \text{EQ1:}$$

where $\alpha$ is the thermal diffusivity of the material and is given by the equation:

$$\alpha=K/\rho C \qquad \text{EQ2:}$$

where K is the thermal conductivity, $\rho$ is the density and C is the specific heat capacity of the material.

In some examples, to increase a thermal gradient across the structure 204, the heater/cooler 214 of the illustrated example can include a first heater/cooler to a first side or surface (e.g., the inner surface 212) of the structure 204 to a first temperature (e.g., a temperature less than ambient temperature) and a second heater/cooler to heat a second side (e.g., an outer surface of one of the walls 208) of the structure 204 to a second temperature (e.g., a temperature greater than ambient temperature). Increasing (e.g., maximizing) a difference between a temperature in the cavity 206 and a temperature outside the cavity 206 provides a greater contrast between hot and cold areas on an image obtained by the camera 216.

To determine and/or coordinate a position (e.g., a location) of the heater/cooler 214 and/or the camera 216 relative to (e.g., a portion of) the structure 204, the NDI system 200 of the illustrated example employs a tracking system 224. In some examples, the tracking system 224 of the illustrated example determines a location of the heater/cooler 214 and/or the camera 216 based on a measurement point or region of the structure 204 to be analyzed by the thermographic inspection system 202. The tracking system 224 of the illustrated example detects a position of the heater/cooler 214 and/or a position of the camera 216 relative to the structure 204 to coordinate or correlate a location or position of the heater/cooler 214 relative to the camera 216. In this manner, the camera 216 obtains images of a portion of the structure 204 of which the heater/cooler 214 has varied (e.g., increased or decreased) the temperature for inspection. The tracking system 224 of the illustrated example communicates the location or positional information of the heater/cooler 214 and the camera 216 to the controller 218, which commands the heater/cooler positioner 220 and/or the camera positioner 222 accordingly. In some examples, the tracking system 224 directly communicates and/or commands the heater/cooler positioner 220 and/or the camera positioner 222. In some examples, the tracking system 224 can include a laser tracker that uses optical targets positioned on the structure 204, the heater/cooler 214, the heater/cooler positioner 220, the camera 216 and/or the camera positioner 222 to coordinate or correlate (e.g., tie) a location or position the heater/cooler 214 and/or the camera 216 relative to the structure 204. In some examples, the tracking system 224 can include optical targets to coordinate or correlate the location of the structure 204 to a location of a pair of photogrammetry cameras. Some example implementations of the tacking system 224 are disclosed in U.S. Pat. No. 9,645,012, which is hereby incorporated herein by reference in its entirety. In some examples, to determine a position of the heater/cooler 214 and/or the camera 216 relative to a location of the structure 204, the tracking system 224 of the illustrated example can be implemented by a global positioning system (GPS) system, encoders and/or any other positioning system(s).

During operation, the controller 218 causes the heater/cooler 214 to heat or cool the structure 204 (e.g., relative to a reference temperature or ambient temperature) to create a thermal gradient in the structure 204 (e.g., create a difference between a temperature of the structure 204 and ambient temperature). The controller 218 causes the camera 216 to acquire or obtain infrared imaging data (e.g., an infrared thermal signature) that emanates from the structure 204 as its temperature returns to ambient temperature. Specifically, the camera 216 of the illustrated example images an infrared spectral radiance from a surface (e.g., of the walls 208 and/or the inner surface 212) of the structure 204, which is representative of surface temperature(s) of the structure 204.

To process the infrared imaging data obtained by the camera 216, the NDI system 200 of the illustrated includes a data analyzer 226. For example, the data analyzer 226 of the illustrated example processes the infrared imaging data and converts the energy detected into one or more temperature value(s) or signature(s) (e.g., an infrared thermal signature). In some examples, the data analyzer 226 generates a complete mosaic image of the structure 204 when the camera 216 captures multiple spatially different images. For example, the infrared imaging data corresponding to different portions or regions of interest of the structure 204 captured by the camera 216 can be combined (e.g., stitched or imaged together) based on locations or positions of the respective camera 216 and/or the heater/cooler 214 relative to the structure 204 provided by the tracking system 224 (e.g., when the camera 216 captured the infrared imaging data). In some examples, the data analyzer 226 can be implemented with the thermographic inspection system 202.

In some examples, the data analyzer 226 detects material defects of the structure 204 based on the thermal signature of the structure 204 generated by the data analyzer 226 from the imaging data obtained by the camera 216. For example, to detect a material defect or inclusion of a foreign material in the structure 204, the data analyzer 226 of the illustrated example can provide a time history of a surface temperature response of the structure 204 as a heated/cooled surface of the structure 204 returns to ambient temperature. Defects in the structure 204 can cause a portion of the surface immediately adjacent (e.g., above) the defect to cool at a different rate than a surrounding defect-free area of the structure 204. Thus, differences in temperature across a surface area of the structure 204 enables the camera 216 to capture and/or identify differing thermal characteristics of the structure 204. Thus, the data analyzer 226 of the illustrated example can detect material defects or inclusion of foreign materials in a surface (e.g., of the walls 208 and/or the inner surface 212) of the structure 204 based on detected anomalies in the heating/cooling behavior (e.g., which can be caused by sub-surface defects blocking the diffusion of heat from the surface of the structure 204).

To detect an anomaly in the thermal signature, the data analyzer 226 of the illustrated example can compare the thermal signature to a reference thermal signature stored in a reference thermal signature database 228. For example, the data analyzer 226 of the illustrated example retrieves, receives and/or otherwise obtains the reference thermal signature and compares (e.g., overlays) the reference thermal signature and the measured thermal signature to identify differences in temperature values across a surface area of the structure 204. In some examples, the data analyzer 226 of the illustrated example retrieves, receives or otherwise obtains a three-dimensional model of the structure 204 from a three-dimensional model database 230. The data analyzer 226 of the illustrated example can overlay or map the measured thermal signature relative to the three-dimensional model of the structure 204. For example, the data analyzer 226 of the illustrated example can employ tracking information detected or determined by the tracking system 224 to map or overlay the thermal signature to the three-dimensional model. The overlay of the thermal signature with the three-dimensional model enables improved data analysis and/or automated data analysis. For example, feature inclusion/flaw indications can be directly correlated to the structure 204 by direct overlay of the infrared imaging data on the three-dimensional model. In addition, the direct data overlay onto the model can be used to determine a thickness of a local area or spatial point, which is needed for porosity quantification. The overlay of the three-dimensional model and the thermal signature can be presented via a display 232.

In some examples, the NDI system 200 of the illustrated example can be used in combination with an ultrasonic inspection system 234. The thermographic inspection system 202 of the illustrated example is preferred over the ultrasonic inspection system 234 because the thermographic inspection system 202 can inspect the structure 204 up to four times faster than the ultrasonic inspection system 234. However, the ultrasonic inspection system 234 can be employed for surfaces of the structure 204 that cannot be (e.g., accurately) analyzed by the thermographic inspection system 202 and/or the ultrasonic inspection system 234 can be employed to work in parallel with the thermographic inspection system 202 to inspect one or more structures of the aircraft 100.

The thermographic inspection system 202, the heater/cooler 214, the heater/cooler positioner 220, the camera 216, the camera positioner 222, the tracking system 224, the controller 218, the reference thermal signature database 228, the three-dimensional model database 230, and the display 232 of the illustrated example can be communicatively coupled via a network (e.g., a process control network). The network can be implemented using any suitable wired and/or wireless network(s) including, for example, one or more data buses, one or more process control networks, one or more Local Area Networks (LANs), one or more wireless LANs, one or more cellular networks, one or more fiber optic networks, one or more private networks, one or more public networks, etc. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
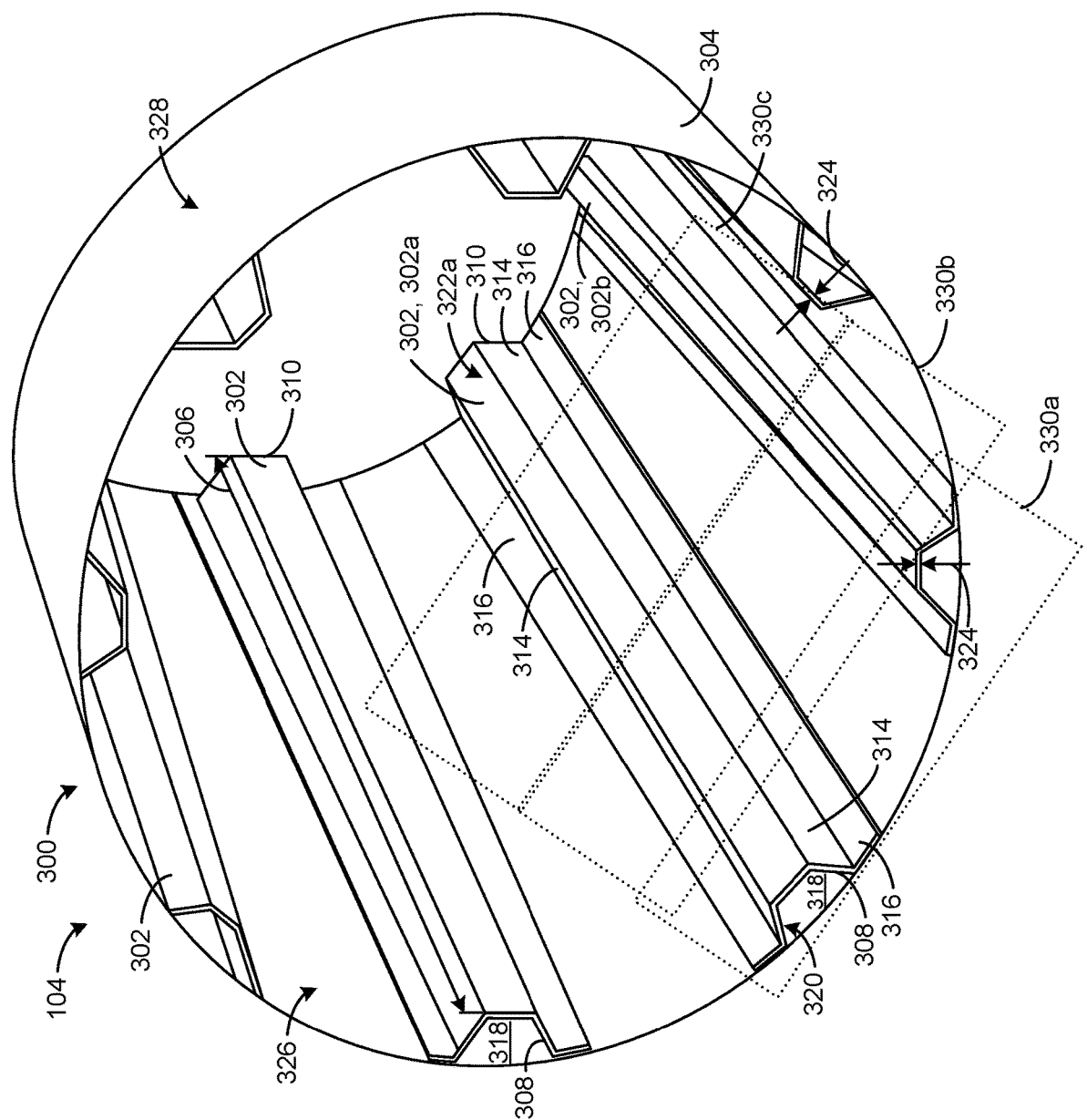
FIG. 3 illustrates a fuselage portion of the aircraft of FIG. 1 that can be inspected by the example NDI system of FIG. 2.

FIG. 3 is a perspective view of a fuselage section or fuselage portion 300 (e.g., a tail portion, a housing, etc.) of the fuselage 104 of the aircraft 100. The fuselage portion 300 of the illustrated example includes a plurality of frames (not shown) that define a cross-sectional shape of the fuselage 104. Stringers 302 of the illustrated example span a longitudinal length of the fuselage portion 300 between the frames. A skin 304 of the fuselage 104 is coupled or attached to the stringers 302 of the fuselage portion 300. In some examples, the fuselage 104 can be a multi-ply composite fuselage 104 such as a carbon fiber reinforced plastic fuselage. Alternatively, the fuselage 104 can be made of a different type of composite material. The wings 102 (FIG. 1) of the aircraft 100 also include stringers to provide structural support to a skin of the wings 102. The example wings 102 can be made of substantially the same composite material as the composite fuselage 104. Alternatively, the wings 102 can be made of a different composite material. Alternatively, the stringers 302 can be used to provide support to another structure, such as another type of aircraft, a watercraft, a land vehicle, etc.

The stringers 302 of the illustrated example define a longitudinal length 306 having a first end 308 and a second end 310 opposite the first end 308. Each of the stringers 302 of the illustrated example includes a cap 312 (e.g., a chord), a pair of longitudinal webs or risers 314 and a pair of longitudinal flanges 316. Each of the risers 314 extends at an angle from a respective opposite side of the cap 312 and engages a respective one of the flanges 316. Each of the flanges 316 extends circumferentially from an inner end of a respective riser 314 and in a direction opposite the other flange 316. The risers 314 and the cap 312 of the illustrated example have a trapezoidal cross-sectional shape. The risers 314, the cap 312 and the skin 304 define an enclosed cavity 318 accessible only at the first and second ends 308, 310 of the stringers 302. For example, the cavity 318 of a first stringer 302a is enclosed by the cap 312, the risers 314 and the skin 304. Thus, only the first and second ends 308, 310 of the cavity 318 are open or exposed. Respective inner surfaces of the risers 314 and the cap 312 define a first side or inner side 320 the first stringer 302a, and respective outer surfaces of the risers 314 and the cap 312 define a second side or outer side 322 of the first stringer 302a opposite the inner side 320. Additionally, each of the stringers 302 of the illustrated example has a thickness 324. For example, the inner side 320 (e.g., a first side) is separated from the outer side 322 (e.g., a second side) by the thickness 324. In some examples, the thickness 324 can be between 20 plies (e.g., 0.16 inches at 0.008 inches per ply) and 30 plies (e.g., 0.24 inches at 0.008 inches per ply) of cured prepreg (e.g., woven or braided fabric or cloth-like tape material such as fiberglass, carbon or graphite fibers that have been impregnated by uncured or partially uncured resin).

In some examples, the thickness 324 of the stringers 302 of the illustrated example can be greater than a thickness threshold for employing reflective (one-sided) reflective thermography non-destructive testing. In other words, employing reflective thermography from an interior 326 of the fuselage 104 to inspect the stringers 302 can not be feasible. Additionally, providing reflective thermography to inspect the stringers 302 from an exterior 328 of the fuselage 104 is not feasible due to air in the cavity 318 between (e.g., an inner surface of) the skin 304 and (e.g., an inner surface of) the cap 312 and the risers 314.

The NDI system 200 of FIG. 2 can be employed to inspect the stringers 302 and/or skin 304 of the fuselage portion 300. For example, the NDI system 200 of FIG. 2 can analyze the stringers 302 in portions or sections. For example, the NDI system 200 of FIG. 2 can analyze a first section 330a of the first stringer 302a, a second section 330b of the first stringer 302a, a third section 330c of the first stringer 302a, etc. In other words, the thermographic inspection system 202 of FIG. 2 can capture multiple spatially different images (e.g., the first, second and third portions 300a-c) and combine (e.g. stitch) the different images together to generate a complete mosaic image of the first stringer 302a along an entire length of the first stringer 302a. In some examples, a portion of the first section 330a can overlap with a portion of the second section 330b, etc. In some examples, the first stringer 302a and a second stringer 302b adjacent the first stringer 302a can be analyzed in parallel (e.g., at substantially the same time). In some examples, the ultrasonic inspection system 234 can inspect the flanges 316 of the stringers 302 and the thermographic inspection system 202 can inspect the risers 314, the cap 312 and/or the skin 304.

Figure 4:
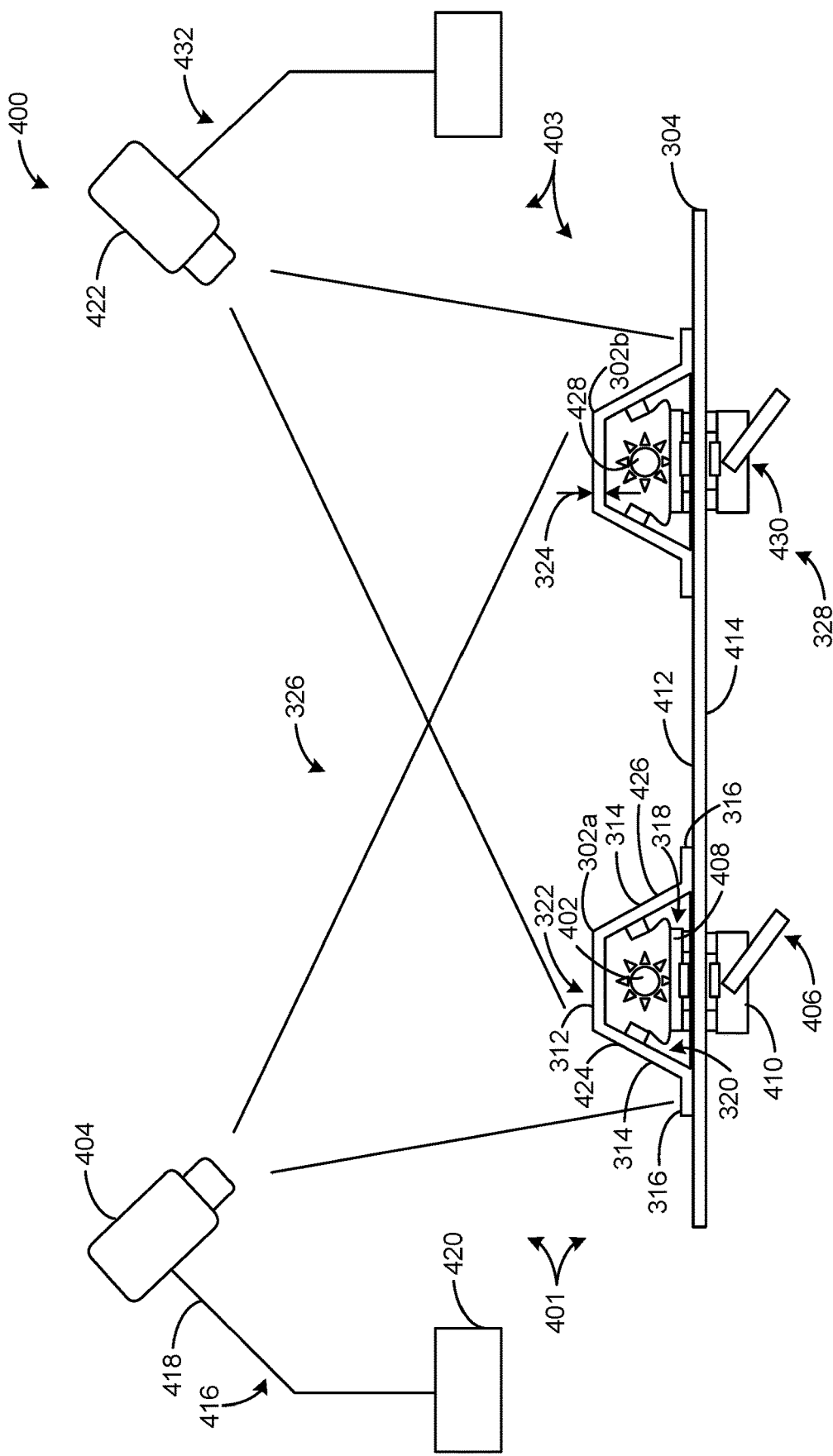
FIGS. 4-8 are schematic illustrations of example thermography inspection systems disclosed herein that can implement the example NDI system of FIG. 2.

FIG. 4 is a schematic side view of an example thermographic inspection system 400 that can implement the thermographic inspection system 202 of the NDI system 200 of FIG. 1. Specifically, the thermographic inspection system 400 of FIG. 4 can be employed to analyze the fuselage portion 300 of FIG. 3. For example, the thermographic inspection system 400 of FIG. 4 can be employed to inspect or analyze the stringers 302 for defects or foreign material inclusions. For clarity, a portion of the fuselage portion 300 of FIG. 3 is shown in FIG. 4. For example, the first stringer 302a and/or the second stringer 302b of the fuselage portion 300 of FIG. 3 are shown in FIG. 4.

The thermographic inspection system 400 of the illustrated example has a first scanning assembly 401 that includes a first heater 402 and a first camera 404. Specifically, the first heater 402 of the illustrated example is positioned inside the cavity 318 of the first stringer 302a. For example, the first heater 402 is a heat source positioned within the cavity 318 and surrounded by the risers 314, the cap 312 and the skin 304. The first heater 402 of the illustrated example generates heat inside the cavity 318 of the first stringer 302a. The first heater 402 of the illustrated example can be a flash lamp, a hot air blower, and/or any other heat generating device or structure to provide a transient heat source from the inner side 320 (e.g., from an inside area) of the first stringer 302a toward the outer side 322 (e.g., an outside or external area) of the first stringer 302a.

To move the first heater 402 between the first end 308 and the second end 310 (FIG. 3) of the first stringer 302a, the thermographic inspection system 400 of the illustrated example employs a first heater positioner 406. For example, the first heater positioner 406 of the illustrated example is a crawler that includes a first crawler portion 408 coupled (e.g., magnetically coupled) to a second crawler portion 410. The first crawler portion 408 is positioned inside the cavity 318 of the first stringer 302a to support the first heater 402. Specifically, the first crawler portion 408 is positioned on an inner surface 412 of the skin 304 and the second crawler portion 410 is positioned on an outer surface 414 of the skin 304 and aligned with the first crawler portion 408. The first and second crawler portions 408, 410 are coupled via magnets. Each of the first and second crawler portions 408, 410 employs wheels to allow the first and second crawler portions 408, 410 to move (e.g., drive or slide) along the longitudinal length 306 (e.g., a distance between a first end 308 and a second end 310 of the first stringer 302a). Thus, movement of the second crawler portion 410 positioned outside of the fuselage portion 300 causes corresponding movement of the first crawler portion 408 positioned inside of the fuselage portion 300 within the cavity 318 of the first stringer 302a. In some examples, the first heater positioner 406 can be a robotic end effector (e.g., a magnetically coupled robotic end effector), a self-propelled crawler, a remote-controlled vehicle, a track and carriage, and/or any other device or structure to move the first heater 402 along the longitudinal length 306 of the first stringer 302a.

To image a surface area of the first stringer 302a, the thermographic inspection system 400 of the illustrated example employs the first camera 404. The first camera 404 of the illustrated example is an infrared camera. To move the first camera 404 along the longitudinal length 306 of the first stringer 302a, the thermographic inspection system 400 of the illustrated example employs a first camera positioner 416. The first camera positioner 416 of the illustrated example includes an arm 418 to support the first camera 404 and a base 420 to support the arm 418. The first camera 404 of the illustrated example can rotate or pivot (e.g., 360-degrees) and/or translate relative to the base 420 (e.g., laterally and/or longitudinally relative to the first stringer 302a) to enable the first camera 404 to image the risers 314, the cap 312 and the flanges 316. In some examples, the arm 418 of the illustrated example can extend and/or retract relative to the base 420 to image a surface area of the first stringer 302a (e.g., the cap 312 and the risers 314). In some examples, the base 420 can include wheels and/or a track to move the first camera 404 along the longitudinal length 306 of the first stringer 302a. In some examples, the first camera positioner 416 can be a base, a robot, a gantry and/or any other track system that allows movement of the first camera 404 along the longitudinal length 306 of the first stringer 302a.

In operation, the first heater 402 generates heat inside the cavity 318 of the first stringer 302a to increase a temperature of the first stringer 302a relative to ambient temperature. For example, the first heater 402 can generate heat to increase a temperature of the first stringer between 5 degrees and 15 degrees relative to ambient temperature over a period of approximately 15 seconds to 1 minute (e.g., a thermal diffusion time for a 20 ply CFRP structure). The first heater 402 generates a thermal gradient across the thickness 324 of the first stringer 302a. Any defects in the first stringer 302a (e.g., across the thickness 324 of the first stringer 302a) affect heat transfer to a surface (e.g., the outer side 322) imaged by the first camera 404. For example, defects in the first stringer 302a can be detected by the data analyzer 226 of FIG. 2. Additionally, the thermographic inspection system 400 of FIG. 4 can analyze the portions (e.g., the portions 330a-c of FIG. 3) of the first stringer 302a over different durations of time. For example, the thermographic inspection system 400 can inspect the first section 330a of the first stringer 302a over a first duration (e.g., a first 10-minute duration), the second section 330b of the first stringer 302a over a second duration (e.g., a second 10-minute duration), etc. until inspection of the longitudinal length 306 (e.g., an entire longitudinal length) of the first stringer 302a is complete. The tracking system 224 of FIG. 2 enables correlation between the first heater 402 and the first camera 404 as the first heater 402 and the first camera 404 move along the longitudinal length 306 of the first stringer 302a. In some examples, the first heater 402 includes a plurality of first heaters, the first heater positioner 406 includes a plurality of first heater positioners, the first camera 404 includes a plurality of first cameras and the first camera positioner 416 includes a plurality of camera positioners that can work in tandem or parallel to inspect the first stringer 302a. For example, in some instances, multiple heaters and/or cameras can be employed to inspect the entire length of the first stringer 302a simultaneously. In some examples, the first heater 402 can be implemented by a heat exchanger. For example, one or more pipes can be positioned in the cavity 318 of the first stringer 302a and hot fluid (e.g., water) passes through the piping to heat or increase a temperature inside the cavity 318. In some such examples, the first heater positioner 406 is not needed.

In some examples, the ultrasonic inspection system 234 can be employed to inspect the flanges 316 of the stringers 302 (e.g., the first stringer 302a). For example, if the first heater 402 is not sufficient to increase a temperature of the flanges 316 of the first stringer 302a to a temperature greater than a threshold temperature needed to detect infrared imaging data, the ultrasonic inspection system 234 can be employed to inspect the flanges 316. In some examples, the ultrasonic inspection system 234 can be employed to inspect the skin 304 while the thermographic inspection system 400 inspects the stringers 302.

In some examples, to image a full surface area (e.g., the outer side 322) of the first stringer 302a, the thermographic inspection system 400 of the illustrated example can employ a second camera 422. For example, the first camera 404 and the second camera 422 can work in tandem to image the full surface area of the first stringer 302a and/or the second stringer 302b. For example, the first camera 404 can obtain imaging data of a first riser 424 and the cap 312 of the first stringer 302a, and the second camera 422 can obtain imaging data of a second riser 426 of the first stringer 302a. The tracking system 224 and the data analyzer 226 of the NDI system 200 of FIG. 2 correlates the imaging data of the first camera 404 and the second camera 422 (e.g., based on a time stamp of the imaging data and/or location of the imaging data).

In some examples, the second camera 422 can be employed (e.g., as part of a second scanning assembly 403) to inspect the second stringer 302b. For example, the thermographic inspection system 400 of the illustrated example can inspect multiple stringers 302 simultaneously. For example, the thermographic inspection system 400 of the illustrated example includes a second heater 428 positioned in the cavity 318 of the second stringer 302b and the second camera 422 captures infrared imaging data of the second stringer 302b. Thus, the second stringer 302b can be inspected contemporaneously or simultaneously with the first stringer 302a. The second heater 428 is supported by and moves along the longitudinal length 306 of the second stringer 302b via a second heater positioner 430 (e.g., a second magnetically coupled crawler). The second camera 422 is supported by a second camera positioner 432. The second heater 428, the second camera 422, the second heater positioner 430 and the second camera positioner 432 of the illustrated example are substantially similar or identical to the respective first heater 402, the first camera 404, the first heater positioner 406 and the first camera positioner 416 and their description will not be repeated for brevity. In some examples, the tracking system 224 and/or the data analyzer 226 of FIG. 2 correlates the positions of the first camera 404 and the second camera 422 and the first heater positioner 406 and the second heater positioner 430 such that the imaging data obtained by the first and second cameras 404, 422 can be used to detect a specific location of flaws, defects or inclusions detected in the first stringer 302a and/or the second stringer 302b. However, in some examples, each of the stringers 302 to be inspected can include a dedicated scanning assembly having a heater, a camera, a heater positioner and a camera positioner.

FIGS. 5-8 illustrate other example thermographic inspection systems 500, 600, 700, 800 that can implement the thermographic inspection system 202 of FIG. 2. Many of the components of the thermographic inspection systems 500, 600, 700, 800 are substantially similar or identical to the components of the thermographic inspection system 400 described above in connection with FIG. 4. As such, those components will not be described in detail again below. Instead, the interested reader is referred to the above corresponding descriptions for a complete written description of the structure and operation of such components. To facilitate this process, identical reference numbers will be used for structures in FIGS. 5-8 that are similar or identical to those in FIG. 4.

Figure 5:
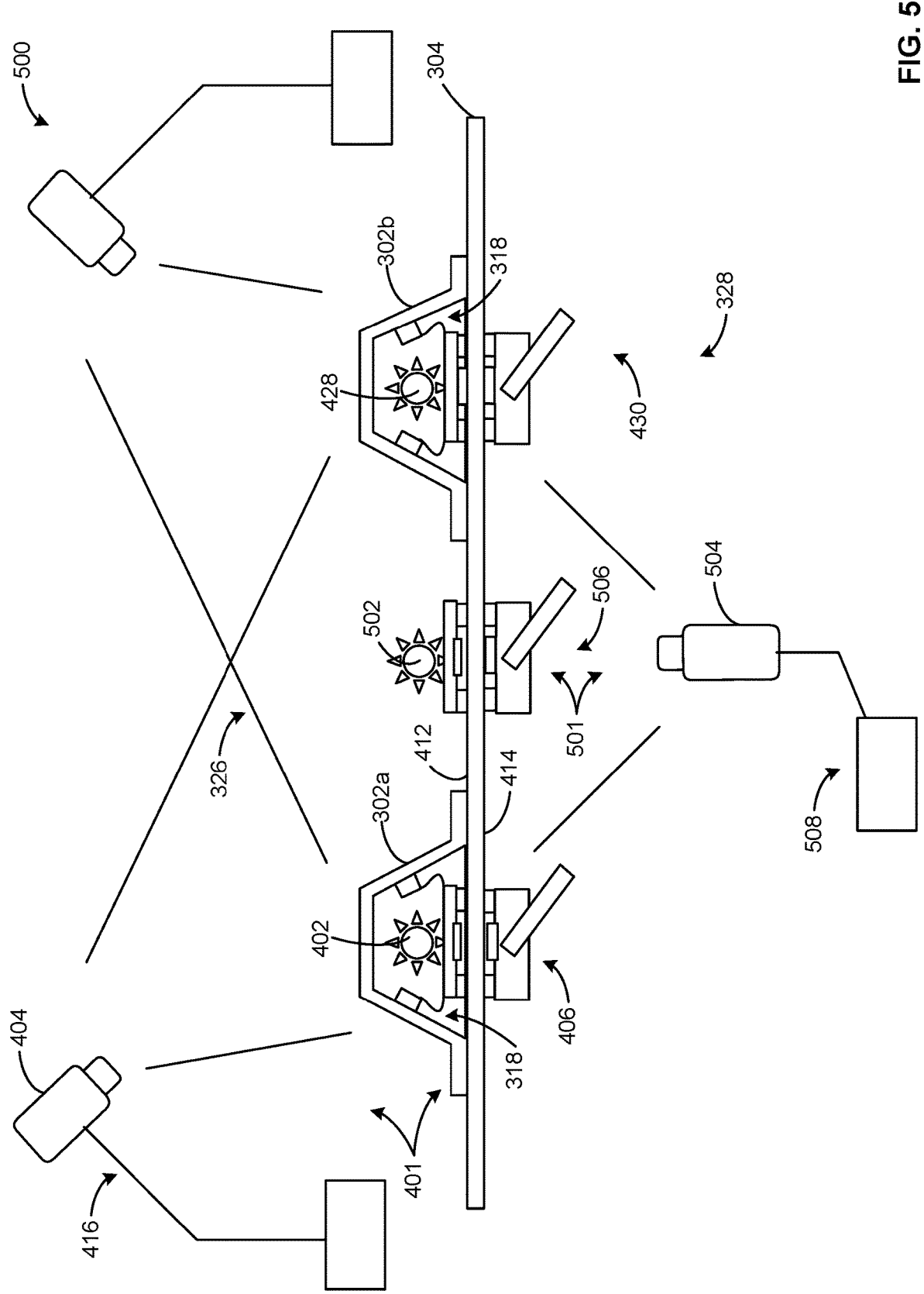

The thermographic inspection system 500 of FIG. 5 includes a third scanning assembly 501 having a third heater 502 to generate heat on the interior 326 (e.g., the inner surface 412) of the skin 304 (e.g., an inner mold line (IML)) of the fuselage portion 300 and a third camera 504 to capture infrared imaging data on the exterior 328 (e.g., the outer surface 414) of the skin 304 (e.g., an outer mold line (OML)) of the fuselage portion 300. In some examples, the skin 304 of the fuselage portion 300 can be inspected simultaneously with the inspection of the stringers 302. The third heater 502 of the illustrated example can be supported by and movable relative to the skin 304 via a third heater positioner 506 (e.g., substantially similar to the first heater positioner 406) and the third camera 504 can be supported and movable relative to the skin 304 via a third camera positioner 508 (e.g., substantially similar to the first camera positioner 416). In some examples, the third heater 502 can be positioned on the outer surface 414 of the skin 304 and the third camera 504 can be positioned on the inner surface 412 of the skin 304. In some examples, the third heater 502 is positioned on the outer surface 414 of the skin 304 and the first camera 404 and/or the second camera 422 can obtain imaging data of the inner surface 412 of the skin 304.

Figure 6:
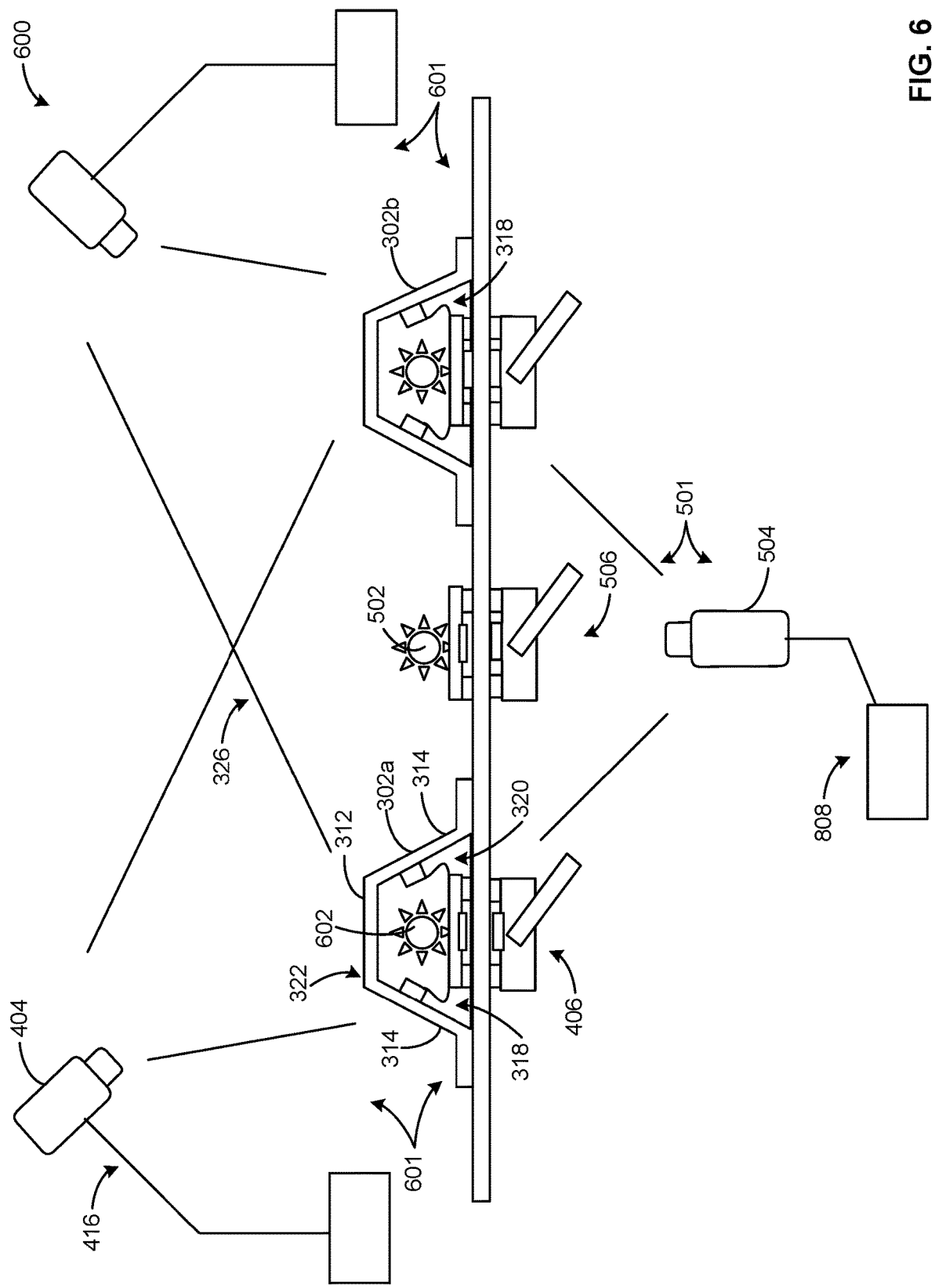

Referring to FIG. 6, the thermographic inspection system 600 of the illustrated example employs cooling techniques. For example, in contrast to the thermographic inspection system 400 of FIG. 4, the thermographic inspection system 600 of the illustrated example cools the inner side 320 of the stringers 302. For example, the thermographic inspection system 600 employs a scanning assembly 601 that includes a cooler 602 and the first camera 404. The cooler 602 of the illustrated example is positioned in the cavity 318 of the first stringer 302a to cool the inner side 320 of the first stringer 302a to a temperature less than ambient temperature from inside the cavity 318 of the first stringer 302a. This configuration provides a greater or higher intensity thermal gradient to improve thermal imaging of the first stringer 302a by the first camera 404. In some examples, applying cooler temperature fluid on the inner side 320 (e.g., an inner surface) of the first stringer 302a and applying warmer temperature fluid on the outer side 322 (e.g., an outer surface) of the first stringer 302a can increase the accuracy of detecting defects in the first stringer 302a. In some such examples, the third heater 502 can be employed to provide heat to the outer side 322 of the first stringer 302a (e.g., on the outside surface of the first stringer 302a).

The cooler 602 can be implemented by a cool air blower that blows cool air in the cavity 318 (e.g., the inner side 320) of the first stringer 302a. In some such examples, the cooler 602 provides cool air to decrease a temperature of the first stringer 302a to a temperature that is less than ambient temperature (e.g., ten degrees cooler relative to ambient temperature). The cooler 602 of the illustrated example is supported by the first cooler positioner 604 and the first camera 404 obtains imaging data of the first stringer 302a as described above. The first cooler positioner 604 is substantially similar or identical to the first heater positioner 406 of FIG. 4. In some examples, the cavity 318 of the first stringer 302a ducts or channels the cool air along the longitudinal length 306 (e.g., the entire longitudinal length) and the first cooler positioner 604 is not needed. In some examples, the cooler 602 can be implemented by a heat exchanger. For example, one or more pipes can be positioned in the cavity 318 of the first stringer 302a and cold fluid (e.g., water) passes through the piping to cool a temperature inside the cavity 318. In some examples, the cavity 318 is heated instead of cooled. In some such examples, the heat may be provided by heat exchanger (e.g., one or more pipes) passing through the cavity 318 of the first stringer 302a.

Figure 7:
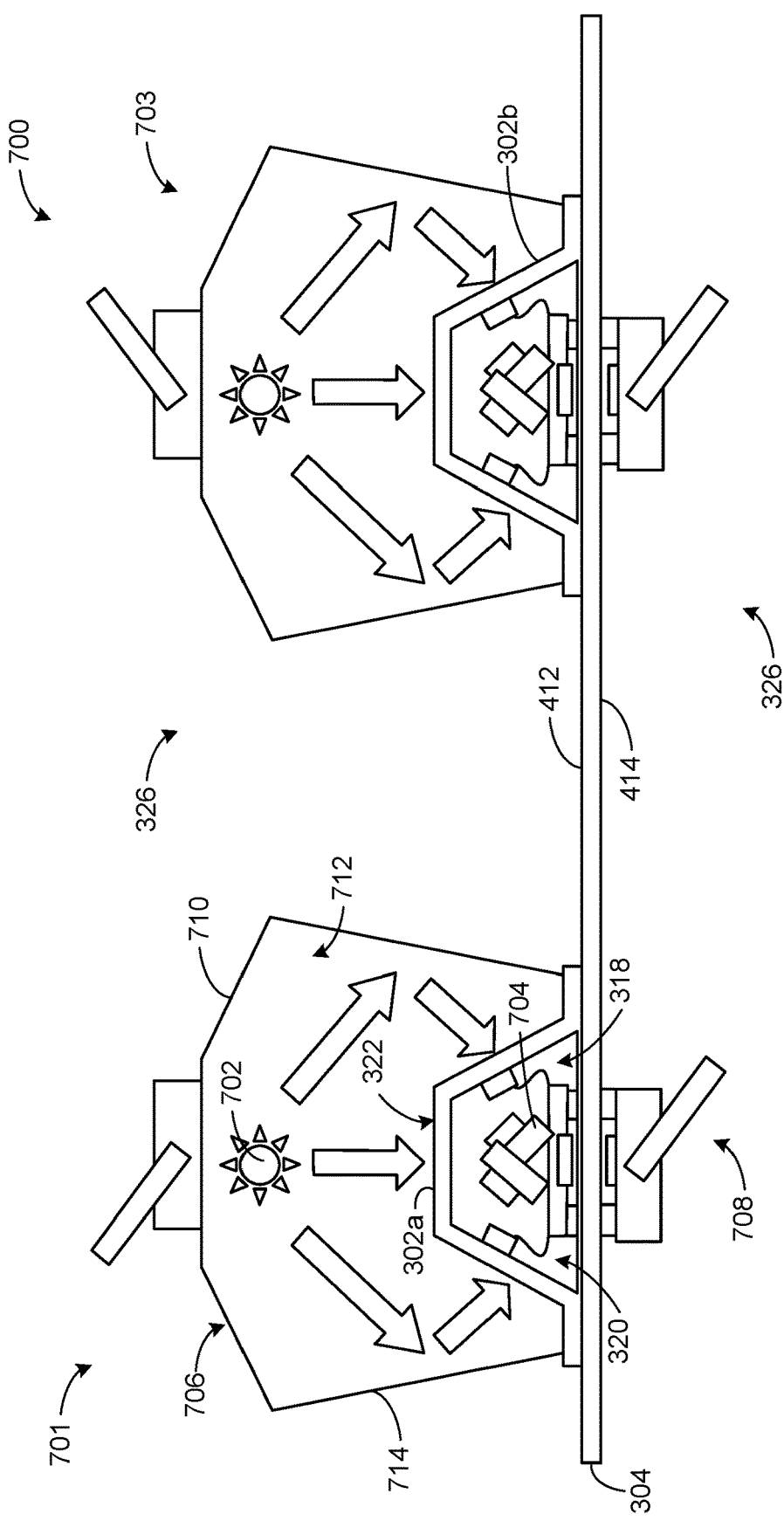

FIG. 7 depicts another example thermographic inspection system 700 that can implement the thermographic inspection system 202 of FIG. 2 and/or can be used to inspect the fuselage portion 300 of FIG. 3. The thermographic inspection system 700 of the illustrated example employs a first scanning assembly 701 including a first heater 702, a first camera 704, a first heater positioner 706 and a first camera positioner 708. In the illustrated example, the first camera 704 is positioned in the cavity 318 and the first heater 702 (e.g., a heat source) is positioned on the outer side 322 of the first stringer 302a. Thus, the first camera 704 obtains (e.g., infrared) imaging data from the inner side 320 of the first stringer 302a and the first heater 702 provides heat to the outer side 322 of the first stringer 302a. The first camera positioner 708 moves the first camera 704 along the longitudinal length 306 of the first stringer 302a. The first camera positioner 708 of the illustrated example is a crawler (e.g., a magnetically coupled crawler) that is substantially similar to the first heater positioner 406 of FIG. 4.

The first heater 702 of the illustrated example is a heat source (e.g., a lamp, a hot air blower, etc.) that provides heat greater than ambient temperature to generate a thermal gradient in the first stringer 302a. To support and move the first heater 702, the thermographic inspection system 700 of the illustrated example employs a first heater positioner 706. The first heater positioner 706 of the illustrated example is positioned over the first stringer 302a. For example, the first heater positioner 710 of the illustrated example is a housing (e.g., a hood or shroud) that includes an opening or cavity 712 to receive the first stringer 302a. In the illustrated example, the first heater positioner 706 straddles or overlaps the first stringer 302a. The first heater positioner 706 of the illustrated example restricts (e.g., prevents) light and/or thermal energy (e.g., heated or cooled air) from exiting the cavity 712 (e.g., which can affect personnel in the vicinity the fuselage portion 300). Additionally, an interior surface 714 of the first heater positioner 706 of the illustrated example includes a reflective material to reflect and/or direct heat from the first heater 702 toward (e.g., the outer surface of) the first stringer 302a. The first heater positioner 706 of the illustrated example can be implemented by a crawler, robot end effector, a self-propelled crawler, and/or any other suitable structure or device to move the first heater 702 along the longitudinal length 306 of the first stringer 302a. The tracking system 224 of FIG. 2 can correlate the position of the first camera 704 and/or first camera positioner 708 and the position of the first heater 702 and/or first heater positioner 706. The thermographic inspection system 700 of the illustrated example enables infrared imaging data from the inner side 320 of the first stringer 302a. In some examples, the thermographic inspection system 700 of the illustrated example can also include a cooler (e.g., the cooler 602 of FIG. 6) positioned in the cavity 318 of the first stringer 302a to increase a thermal gradient across the first stringer 302a.

The thermographic inspection system 700 can include additional scanning assemblies to inspect other structures (e.g., the stringers 302) of the fuselage portion 300 simultaneously with the inspection of the first stringer 302a. For example, the thermographic inspection system 700 of FIG. 7 includes a second scanning assembly 703 to inspect the second stringer 302b. The second scanning assembly 703 is substantially similar or identical to the first scanning assembly 701.

Figure 8:
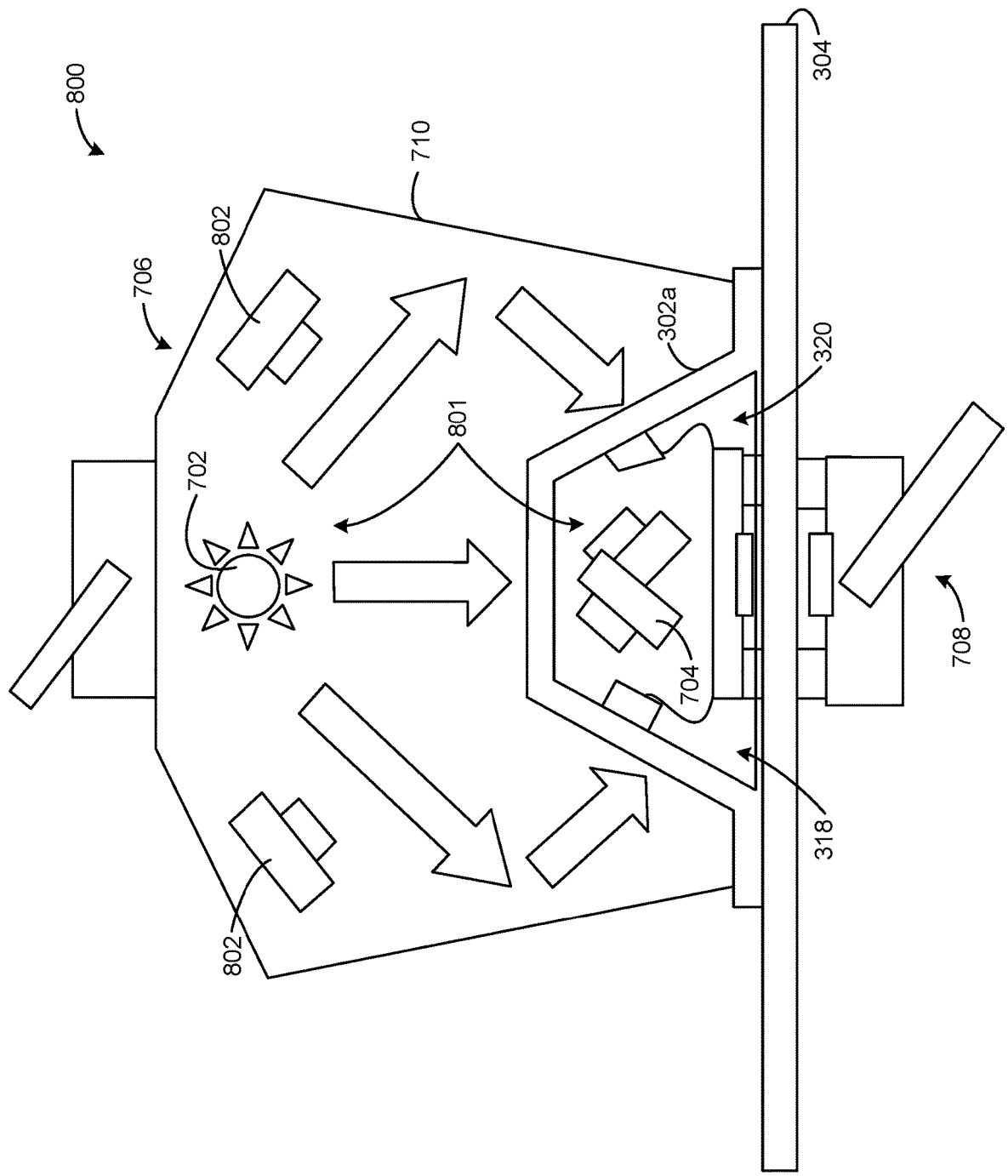

FIG. 8 illustrates another example thermographic inspection system 800 that can implement the thermographic inspection system 202 of FIG. 2. The thermographic inspection system 800 of the illustrated example is substantially similar to the thermographic inspection system 700. However, a scanning assembly 801 of the thermographic inspection system 800 includes a second camera 802 coupled to the first heater positioner 706. The second camera 802 obtains (e.g., infrared) imaging data from the outer side 322 of the first stringer 302a while the first camera 704 obtains (e.g., infrared) imaging data from the first side of the first stringer 302a. In other words, the second camera 802 of the illustrated example obtains imaging data of the outside surface of the first stringer 302a and the first camera 704 of the illustrated example obtains imaging data of the inner surface of the first stringer 302a when the first heater 702 provides a temperature gradient to the first stringer 302a. The second camera 802 is supported by and movable along the longitudinal length 306 of the first stringer 302a via the first heater positioner 706. In some examples, the tracking system 224 and the data analyzer 226 of the FIG. 2 correlates the imaging data obtained by the first camera 704 with the imaging data obtained by the second camera 802. The combination of the imaging data provided by the first and second cameras 704, 802 can provide additional information of the defects based on the observed heat transfer analysis, thereby improving flaw characterization capability. For example, providing dual imaging from the inner side 320 and the outer side 322 can help identify if a flaw or defect is closer to the inner side 320 or the outer side 322 of the first stringer 302a. Such information can be useful to determine which side of the first stringer 302a to score (e.g., cut) to fix or remove the detected deflect or flaw. Such configuration is particularly useful when analyzing structures having relatively large thickness (e.g., stringer or composite structures having thicknesses greater than 15 plies).

In some examples, a cooler (e.g., the cooler 602 of FIG. 6) can be provided in the cavity 318 of the first stringer 302a along with the first camera 704. For example, the first heater 702 can heat the outside surface or the outer side 322 of the first stringer 302a and the cooler can cool the inside surface or the inner side 320 of the first stringer 302a. For example, the first heater 702 can provide heated air having a temperature that is greater than ambient temperature and the cooler can provide cooled air having a temperature that is less than ambient temperature. In some such examples, the contrast in temperature between the inner side 320 of the first stringer 302a and the outer side 322 of the first stringer 302a can provide a thermal gradient having a greater intensity that results in a higher quality thermal signature.

In some examples, the first heater 702 can be positioned in the cavity 318 of the first stringer 302a and moved along the longitudinal length 306 via the first camera positioner 708 and the cooler can be supported by the first heater positioner 706. In some such examples, the first heater 702 heats the inner side 320 of the first stringer 302a and the cooler cools the outer side 322 of the first stringer 302a.

Figure 9:
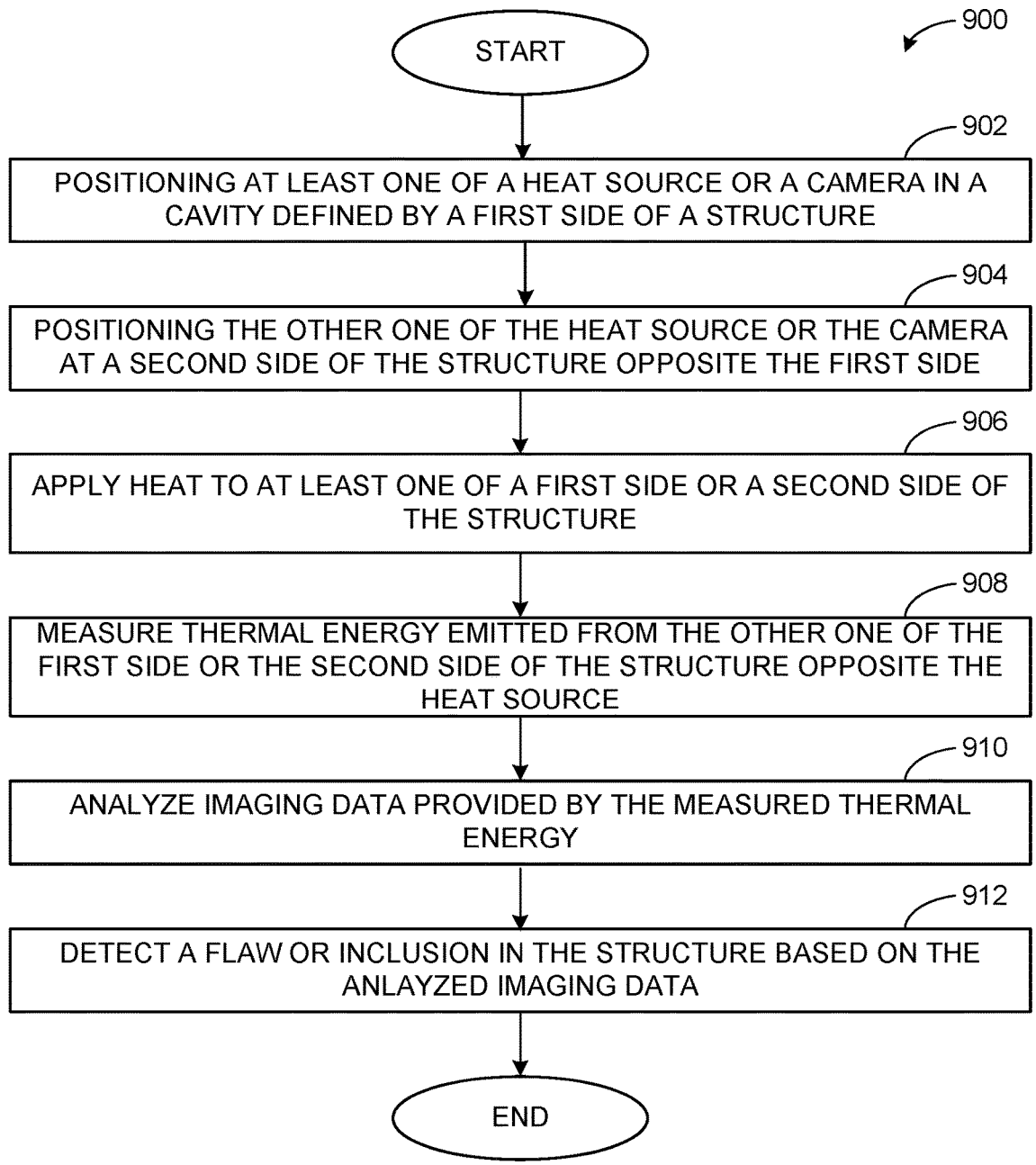
FIGS. 9 and 10 are flowcharts representative of example methods of inspecting a structure employing the thermography inspection systems of FIGS. 2 and 4-7.
Figure 10:
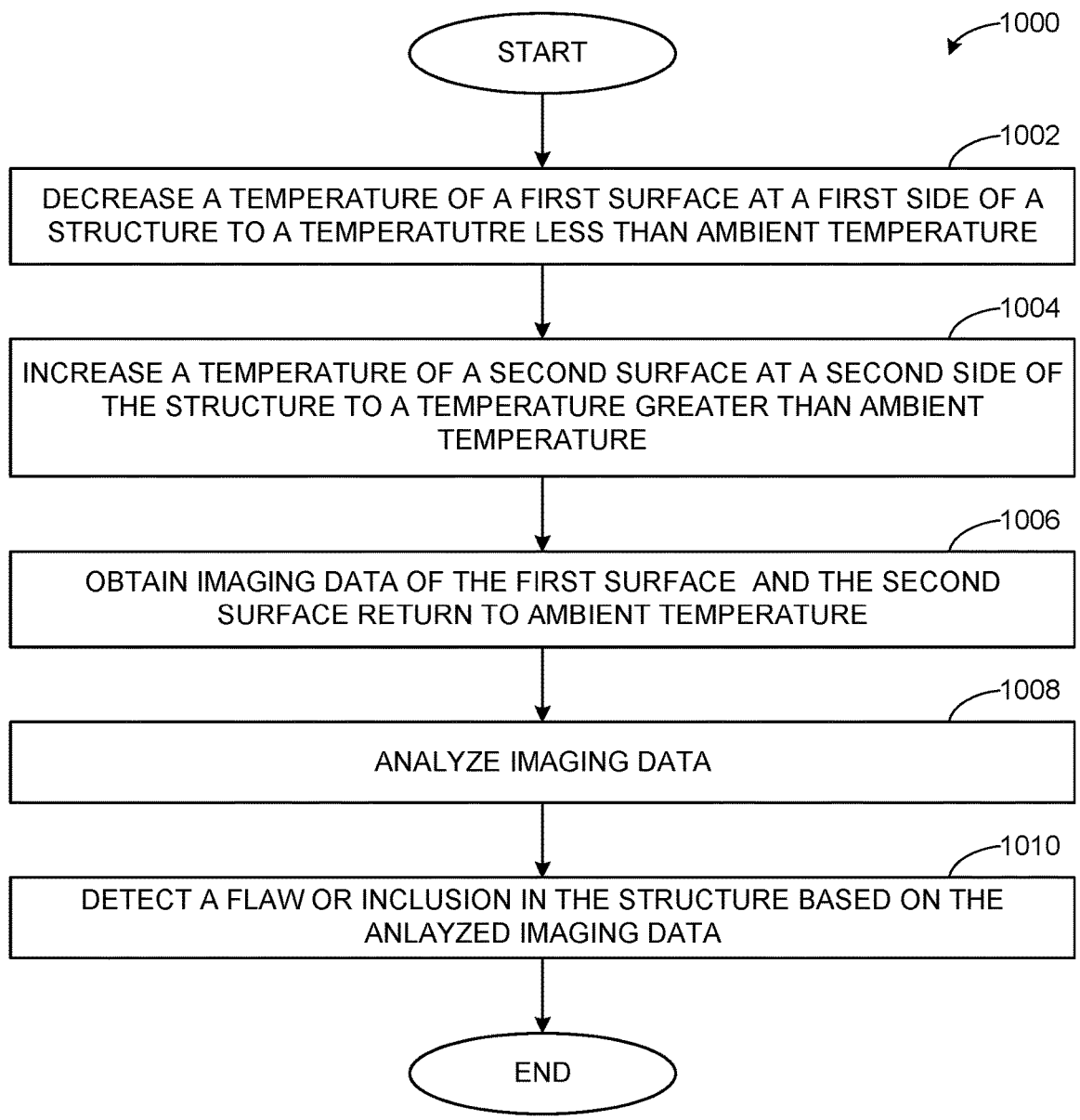

FIGS. 9 and 10 depict example flowcharts representative of example methods 900, 1000 for inspecting a structure 204 of FIG. 2 (e.g., a limited access composite structure) such as, for example, the stringers 302 of FIGS. 3-8. In some examples, the blocks can be re-arranged or removed, or additional blocks can be added. The method begins by positioning at least one of a heat source or a camera in a cavity 206 defined by a first side of a structure 204 (block 902). For example, the first heater 402 of FIG. 4 can be positioned in the cavity 318 of the first stringer 302a or the first camera 704 can be positioned in the cavity 318 of the first stringer 302a.

The other one of the heat source or the camera is positioned at the second side of the structure 204 opposite the first side (block 904). For example, the first camera 404 of FIG. 4 can be positioned to obtain imaging data of the outer side 322 of the first stringer 302a or the first heater 702 of FIGS. 7 and 8 can be positioned to generate heat to the outer side 322 of the first stringer 302a.

Heat is applied to at least one of the first side or the second side of the structure 204 (block 906). In some examples, the first heater 402 of FIG. 4 can apply heat to the inner side 320 of the first stringer 302a. In some examples, the third heater 502 and/or the first heater 702 of FIGS. 5 and 7, respectively, apply heat to the outer side 322 of the first stringer 302a.

After the heat is applied to at least one of the first side or the second side, thermal energy emitted by the other one of the first side or the second side is measured (block 908). For example, the first camera 404 of FIG. 4 obtains imaging data provided by the measured thermal energy emitted from the outer side 322 of the first stringer 302a when the first heater 402 provides heat to the inner side 320 of the first stringer 302a. In some examples, the first camera 404 obtains imaging data by measuring the thermal energy emitted from the outer side 322 of the first stringer 302a after the first heater 402 provides heat to the inner side 320 of the first stringer 302a. The imaging data obtained from the measured thermal energy is analyzed (block 910) to determine a presence of a flaw or inclusion (block 912). For example, the data analyzer 226 employs the reference thermal signature database 228 and/or the three-dimensional model database 230 to compare a thermal signature of the inspected first stringer 302a to known thermal signatures to detect flaws or inclusions in the first stringer 302a.

Referring to FIG. 10, the method 1000 includes decreasing a temperature of a first surface at a first side of a structure 204 to a temperature less than ambient temperature (block 1002) and increasing a temperature of a second surface at a second side of the structure 204 to a temperature greater than ambient temperature (block 1004). For example, the cooler 602 of FIG. 6 can cool inside the cavity 318 of the first stringer 302a to decrease the surface temperature of the inner side 320 of the first stringer 302a and the third heater 502 can provide heat to increase a surface temperature of the outer side 322 of the first stringer 302a. In some examples, a cooler can decrease a temperature in the cavity 712 of the first heater positioner 710 of FIGS. 7 and 8 and a heater can increase a temperature in the cavity 318 of the first stringer 302a, or vise versa. The first surface temperature and the second temperature are then allowed to return to ambient temperature. As the first surface temperature and the second surface temperature return to ambient temperature, imaging data of the first surface and/or the second surface are obtained (block 1006). For example, the first camera 404 obtains imaging data from the outer side 322 of the first stringer 302a. In some examples, the first camera 704 and/or the second camera 802 obtains imaging data from the inner side 320 and the outer side 322 of the first stringer 302a, respectively. The imaging data obtained from the measured thermal energy is analyzed (block 1008) to determine a presence of a flaw or inclusion (block 1010). For example, the data analyzer 226 employs the reference thermal signature database 228 and/or the three-dimensional model database 230 to generate a thermal signature of the inspected first stringer 302a to detect flaws or inclusions in the first stringer 302a.

Several examples have been described throughout this specification. Any features from any example can be included with, a replacement for, or otherwise combined with other features from other examples. For example, any components or features of one of the thermographic inspection system 202, 400, 500, 600, 700, 800 can be included with, replaced with, or otherwise combined with other components or features of the other ones of the thermographic inspection systems 202, 400, 500, 600, 700, 800.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A method comprising:
    positioning at least one of a heat source or a camera in a cavity defined by a first side of a structure of an aircraft;
    positioning the other one of the heat source or the camera at a second side of the structure opposite the first side;
    applying heat, via the heat source, to the least one of the first side or the second side of the structure;
    measuring, via the camera, thermal energy emitted from the other one of the first side or the second side opposite the heat source; and
    identifying a defect or inclusion of the structure based on the measured thermal energy.

2. The method of claim 1, further including moving the camera along a longitudinal length of the structure via a robot.

3. The method of claim 1, further including moving the heat source along a longitudinal length of the structure via a crawler.

4. The method of claim 3, further including decreasing a temperature of a surface at the second side of the structure to a second temperature that is less than an ambient temperature.

5. The method of claim 1, wherein the structure of the aircraft includes a stringer coupled to a skin, the stringer having a first riser, a second riser, and a chord coupled to respective first ends of the first riser and the second riser, respective ones of inner surfaces of the first riser, the second riser, and the chord defining the first side of the structure, respective ones of outer surfaces of the first riser, the second riser and the chord defining the second side of the structure opposite the first side, the skin coupled adjacent the second ends of the first riser and the second riser, the first riser, the second riser, the chord and the skin defining the cavity being accessible only at respective longitudinal ends of the stringer, the method further including:
   positioning the heat source in the cavity;
   increasing a temperature of a first surface at the first side of the structure to a first temperature that is greater than ambient temperature;
   positioning the camera at the second side of the structure;
   measuring the thermal energy by obtaining imaging data of a second surface at the second side of the structure as the temperature of the first surface of the structure returns to the ambient temperature; and
   analyzing the imaging data to identify the defect or inclusion of the structure.

6. The method of claim 5, wherein the camera is a first camera, and further comprising a second camera positioned to obtain imaging data on a second side of the skin opposite a first side of the skin, the first side of the skin defining an inner surface of a fuselage and the second side of the skin defining an outer surface of the fuselage.

7. The method of claim 1, further including positioning the heat source at the first side of the structure via the cavity of the structure and positioning the camera at the second side of the structure.

8. The method of claim 7, further including moving the heat source through the cavity along a longitudinal length of the structure.

9. The method of claim 7, further including causing the camera to scan a longitudinal length of the structure.

10. The method of claim 1, further including positioning the camera at the first side of the structure and positioning the heat source at the second side of the structure.

11. The method of claim 10, further including moving the camera through the cavity along a longitudinal length of the structure.

12. The method of claim 10, further including providing cooled fluid in the cavity of the structure when providing heat to the second side of the structure via the heat source.

13. The method of claim 10, further including:
   positioning a second camera to obtain imaging data of the second side of the structure; and
   measuring, via the camera, thermal energy emitted from the second side of the structure.

14. The method of claim 10, further including moving the heat source along a longitudinal length of the structure via a housing.

15. The method of claim 14, wherein positioning the camera includes positioning a first camera in the cavity to obtain imaging data of the first side of the structure and positioning a second camera on the housing to obtain imaging data of the second side of the structure.

* * * * *